M. D. PHELAN.
SELF ALINING BEARING.
APPLICATION FILED AUG. 3, 1917.

1,321,142.

Patented Nov. 11, 1919.
2 SHEETS—SHEET 1.

INVENTOR
Merton D. Phelan

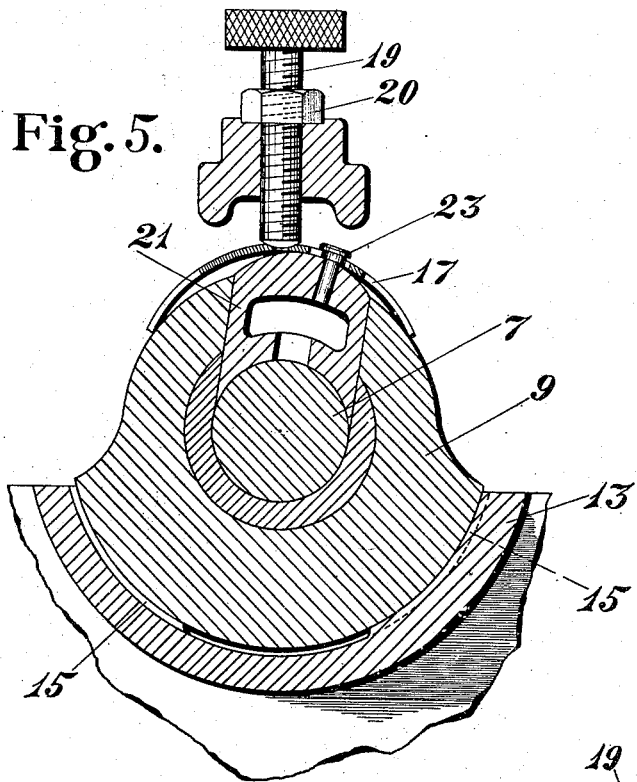
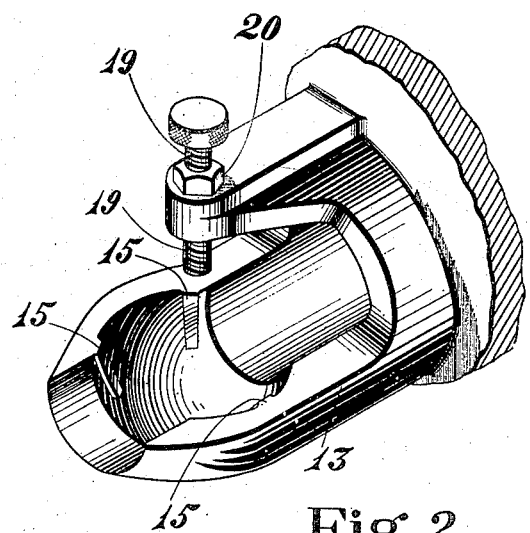
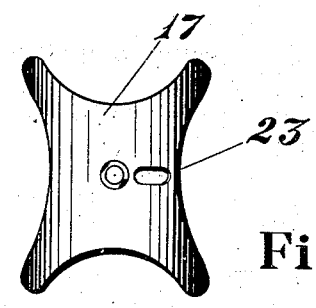
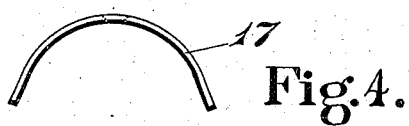

UNITED STATES PATENT OFFICE.

MERTON D. PHELAN, OF BOSTON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

SELF-ALINING BEARING.

1,321,142.      Specification of Letters Patent.    Patented Nov. 11, 1919.

Application filed August 3, 1917. Serial No. 184,340.

*To all whom it may concern:*

Be it known that I, MERTON D. PHELAN, a citizen of the United States, residing at Boston, in the county of Suffolk and State of Massachusetts, have invented certain Improvements in Self-Alining Bearings, of which the following description, in connection with the accompanying drawings, is a specification, like reference characters on the drawings indicating like parts in the several figures.

This invention relates to journal bearing structures of the self-alining type and more particularly to an improved strucure of self-alining bearing which may be manufactured at small expense.

One type of self-alining journal bearing structure which has been commonly used comprises a journal box having a spherical portion and a supporting bearing having a hollowed-out chamber or cavity which fits the spherical portion of the box, the complete structure operating in the manner of a ball-and-socket joint. Such a structure, however, requires for its successful operation that the bearing surfaces shall be precisely machined, and the expense of this machining operation precludes in many instances the use of this structure.

The general object of the present invention is to provide a structure which shall have the advantages of the ball-and-socket type referred to above and shall at the same time require no machine work.

One feature of the invention consists of a journal bearing structure in which the bearing for the journal box comprises a plurality of separated surfaces, the construction and arrangement being such that when the box is placed upon these bearing surfaces it will automatically center itself in respect to these surfaces, accommodating itself to whatever irregularities there may be. By this construction and arrangement, among other advantages, machine work is entirely eliminated, the contacting bearing surfaces being left unfinished. Preferably and as shown, the effective contacting surfaces of the box and bearing are substantially spherical. Preferably too, yielding means are provided for pressing the box and bearing together.

In accordance with another feature of the invention, the journal box is provided with novel wear compensating means constructed and arranged to permit convenient and certain manipulation of said means without interfering in any way with the capacity of the journal box for universal movement. In the illustrated construction the means for yieldingly pressing the parts of the journal box together is utilized for positively controlling the wear compensating device.

These and other features of the invention will be described as embodied in an illustrative structure and will be pointed out in the appended claims.

Referring now to the accompanying drawings,—

Fig. 2 is a perspective of the supporting bearing member and the means for holding the journal box and supporting bearing in contact;

Fig. 3 is a plan of the spring shown in Fig. 1;

Fig. 4 is an elevation of the spring, and

Fig. 5 is a detail in section showing the mounting of the wear-compensating member.

Figure 1:
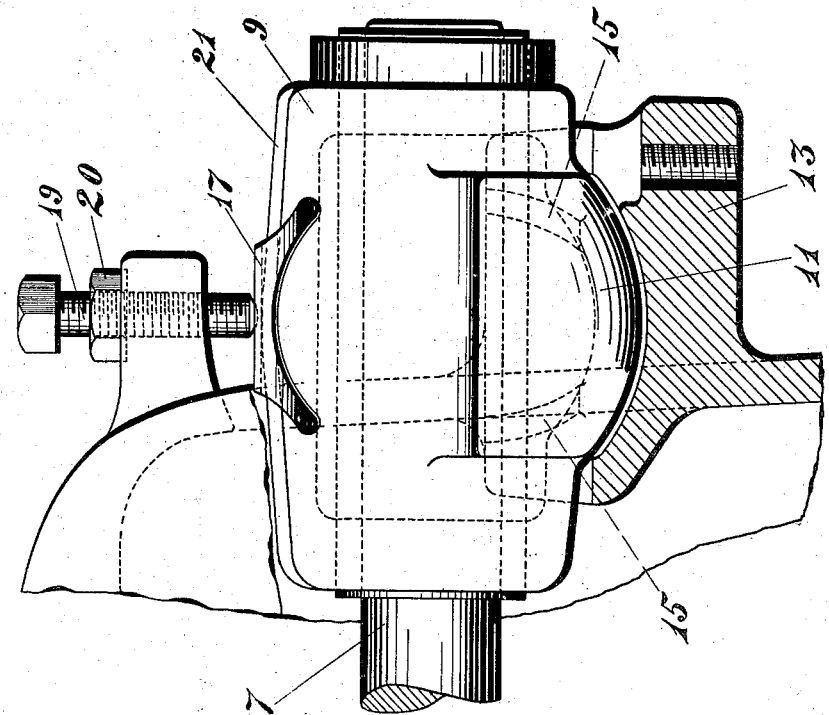
Figure 1 is an elevation of a portion of a machine in which the present invention is embodied.
Figure 1:
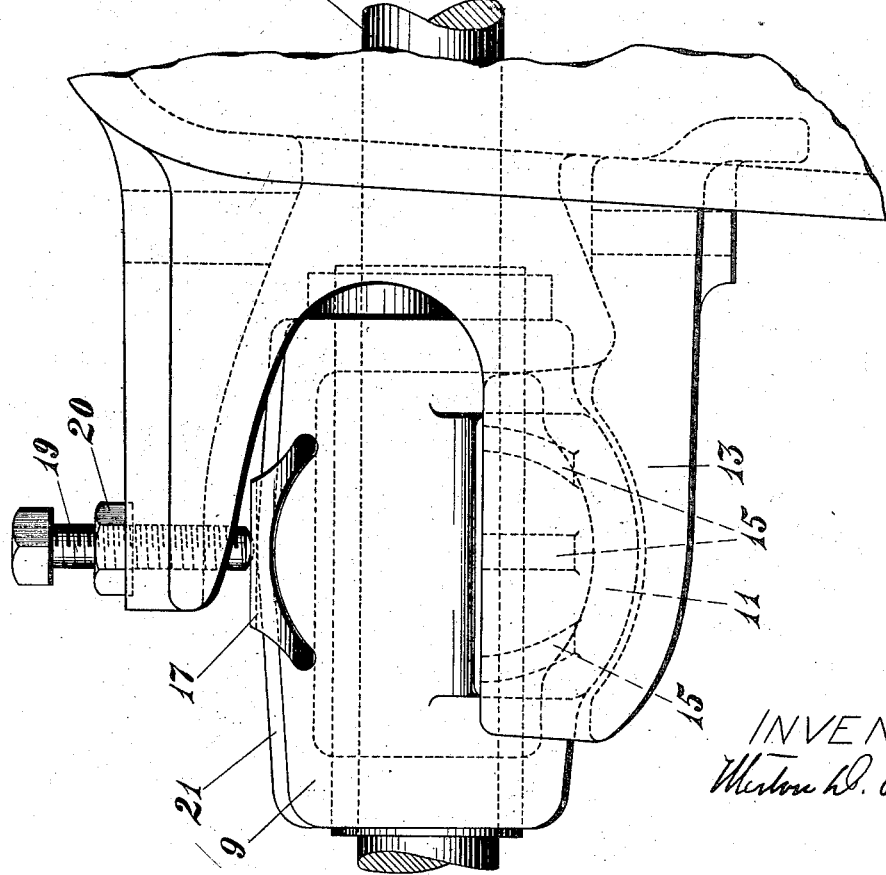

Referring first to Fig. 1 in which part of the head of an edge trimming machine is shown, the shaft 7 is rotatably mounted in journal boxes 9, and is driven by a pulley (not shown) fast to the middle of the shaft which has been broken away, the edge trimming cutter (also not shown) being fast to the left-hand end of the shaft. Each journal box 9 has a depending portion 11, the surface of which is substantially spherical, by which the box is supported. Each supporting member 13, herein illustrated as integral with the frame of the machine. is hollowed out and provided with three ribs or projections 15 arranged triangularly so as to form a three-point bearing for the spherical portion of the journal box. The surfaces of these ribs or points are part of substantially the same sphere as that of the surface of the spherical portion 11. The journal boxes thus have bearings upon these sets of ribs or points and are free to move angularly in all directions to compensate for differences in vertical or horizontal positions of the bearings. They will therefore automatically assume the proper positions to permit the shaft to run freely.

Although the projecting portions 11 of the journal boxes have been shown as having continuous spherical surfaces and the supporting members 13 as hollowed out on spherical curves, it should be understood that this particular construction is not essential. Nor is it essential that the bearing points or ribs be of the shape shown or that they be formed upon the supporting member.

In order to insure that the boxes shall remain approximately upright and in contact with the supporting members, springs 17, of the shape best shown in Figs. 3 and 4, are located on the tops of the boxes and are acted upon by screw bolts 19 provided with lock nuts 20 so that pressure may be applied to the boxes through the springs. The use of springs between the conical ends of the screw bolts and the boxes is desirable because the amount of pressure applied may thus be regulated, and the adjustment requires less skill.

It is desirable to provide means for taking up wear of the bearings of the shaft; and to this end wear-compensating members 21 are suspended by headed pins 23 from the springs 17. When the screw bolts 19 are moved downwardly, the first effect of this movement is to force the journal boxes yieldingly against their supports. Upon further downward movement the under sides of the springs come into contact with the wear-compensating members and force them downwardly against the shaft.

One great advantage of the self-alining journal bearing structure which has been described above is, as has been stated, that both the bearing surfaces of the boxes and those of the supporting members need no machine work but may be left unfinished just as they come out of the molds in which they are cast.

Although the invention has been set forth in connection with a particular machine, it should be understood that the invention is not limited in the scope of its application to the particular machine which has been shown and described.

Having thus described my invention, what I claim as new and desire to secure by Letters Patent of the United States is:—

1. A journal bearing structure having, in combination, a journal box, a supporting bearing therefor, the contacting surfaces of the box and bearing being located at separated points and being substantially parts of the surfaces of spheres having a common center, a spring, and means acting through the spring for pressing the box and bearing together.

2. A journal bearing structure having, in combination, a journal box having a portion the effective surface of which is substantially spherical, and a multi-point bearing for the box, the contacting surfaces of the box and bearing being unfinished.

3. A journal bearing structure having, in combination, a journal box having a portion the effective surface of which is substantially spherical, a multi-point bearing for the box, the contacting surfaces of the box and bearing being unfinished, and means for pressing the box and bearing together.

4. A journal bearing structure having, in combination, a journal box having a portion the effective surface of which is substantially spherical, a multi-point bearing for the box, the contacting surfaces of the box and bearing being unfinished, a spring, and means acting through the spring for pressing the box and bearing together.

5. A journal bearing structure having, in combination, a journal box, and a supporting bearing therefor, the contacting surfaces of the box and bearing being located at three separated points and being substantially part of the surface of a common sphere.

6. A journal bearing structure having, in combination, a journal box, a supporting bearing therefor, the contacting surfaces of the box and bearing being located at three separated points and being substantially part of the surface of a common sphere, and means for pressing the box and bearing together.

7. A journal bearing structure having, in combination, a journal box, a supporting bearing therefor, the contacting surfaces of the box and bearing being located at three separated points and being substantially part of the surface of a common sphere, a spring, and means acting through the spring for pressing the box and bearing together.

8. A journal bearing structure having, in combination, a journal box having a portion the effective surface of which is substantially spherical, and a three-point bearing constructed and arranged to support the box and to permit angular movement of the box in all directions.

9. A journal bearing structure having, in combination, a journal box having a portion the effective surface of which is substantially spherical, a three-point bearing constructed and arranged to support the box and to permit angular movement of the box in all directions, and means for holding the box and bearing in contact.

10. A journal bearing structure having, in combination, a journal box having a portion the effective surface of which is substantially spherical, a three-point bearing constructed and arranged to support the box and to permit angular movement of the box in all directions, a spring, and means acting through the spring for pressing the box and bearing together.

11. A journal bearing structure having, in combination, a journal box member, and a bearing member for supporting the box member, one of said members having a portion the effective surface of which is substantially part of the surface of a sphere and the other having three separated bearing surfaces which are substantially parts of the surface of the same sphere as that of the spherical portion of the box.

12. A journal bearing structure having, in combination, a journal box member, a bearing member for supporting the box member, one of said members having a portion the effective surface of which is substantially part of the surface of a sphere and the other having three separated bearing surfaces which are substantially parts of the surface of the same sphere as that of the spherical portion of the box, and means for holding the members in contact.

13. A journal bearing structure having, in combination, a journal box member, a bearing member for supporting the box member, one of said members having a portion the effective surface of which is substantially part of the surface of a sphere and the other having three separated bearing surfaces which are substantially parts of the surface of the same sphere as that of the spherical portion of the box, a spring, and means acting through the spring for holding the members in contact.

14. A journal bearing structure comprising a journal box having a spherical portion, and a bearing for the box comprising a plurality of separated bearing members the bearing surfaces of which are substantially parts of the surface of the same sphere as that of the spherical portion of the box.

15. A journal bearing structure comprising a journal box having a spherical portion, a bearing for the box comprising a plurality of separated bearing members the bearing surfaces of which are substantially parts of the surface of the same sphere as that of the spherical portion of the box, and means for holding the box and its bearing in contact while permitting the box to move angularly.

16. A journal bearing structure comprising a journal box having a spherical portion, a bearing for the box comprising a plurality of separated bearing members the bearing surfaces of which are substantially parts of the surface of the same sphere as that of the spherical portion of the box, a spring, and means acting through the spring for holding the box and its bearing in contact.

17. The combination with a shaft, of a plurality of journal boxes in which the shaft is rotatable, each box having a substantially spherical portion, and a plurality of separated bearing members for each box the surfaces of which are part of a common spherical surface of substantially the same radius of curvature as that of the spherical portion of the corresponding box.

18. A journal bearing structure having, in combination, a journal box comprising a body member and a wear-compensating member, said body member having a spherical portion, a three-point bearing for supporting the box by contact with the spherical portion, a spring, means acting through the spring to hold the box and bearing in contact, and means for suspending the wear-compensating member from the spring.

19. A journal bearing structure having, in combination, a journal box comprising a body member and a wear-compensating member, a bearing for the box, a spring, means acting through the spring to hold the box and bearing in contact, and means for suspending the wear-compensating member from the spring.

20. A journal bearing structure having, in combination, a body member, a wear-compensating member, a spring from which the wear-compensating member is suspended, and means for adjusting the wear-compensating member against the force of the spring.

21. A journal bearing structure having, in combination, a journal box comprising a body member and a wear-compensating member, a bearing for the box, and means for yieldingly forcing the box and bearing together and for positively adjusting the wear-compensating member.

22. A journal bearing structure having, in combination, a journal box and a supporting bearing therefor the contacting surfaces of the box and bearing being located at separated points, the construction and arrangement being such as to permit angular movement of the box in all directions.

In testimony whereof I have signed my name to this specification.

MERTON D. PHELAN.